(12) United States Patent
Kim

(10) Patent No.: US 7,965,672 B2
(45) Date of Patent: Jun. 21, 2011

(54) METHOD AND APPARATUS FOR CELL SELECTION IN A MOBILE COMMUNICATION SYSTEM

(75) Inventor: Chang-Young Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 670 days.

(21) Appl. No.: 11/713,581

(22) Filed: Mar. 2, 2007

(65) Prior Publication Data
US 2007/0213061 A1 Sep. 13, 2007

(30) Foreign Application Priority Data
Mar. 2, 2006 (KR) .......................... 10-2006-0020185

(51) Int. Cl.
*H04Q 1/00* (2006.01)
(52) U.S. Cl. ........ 370/327; 370/329; 370/331; 455/441; 455/444
(58) Field of Classification Search .................. 370/327, 370/328, 329, 331; 455/441, 444, 436, 438, 455/439, 440, 442, 443, 425, 435.1, 525
See application file for complete search history.

(56) References Cited

U.S. PATENT DOCUMENTS

| | | | | |
|---|---|---|---|---|
| 5,805,993 | A * | 9/1998 | Cherpantier et al. | 455/422.1 |
| 6,208,863 | B1 * | 3/2001 | Salonaho | 455/444 |
| 7,016,680 | B2 * | 3/2006 | Yagi | 455/441 |
| 2004/0043769 | A1 | 3/2004 | Amerga et al. | |
| 2004/0053626 | A1 * | 3/2004 | Yagi | 455/456.1 |
| 2006/0111108 | A1 * | 5/2006 | Newbury et al. | 455/436 |

FOREIGN PATENT DOCUMENTS

| | | |
|---|---|---|
| JP | 2004-159304 | 6/2004 |
| KR | 1999-0043760 | 6/1999 |
| KR | 1020050083260 | 8/2005 |

OTHER PUBLICATIONS

Jabbari, "Teletraffic Aspects of Evolving and Next-Generation Wireless Communication Networks", IEEE Personal Communications, Dec. 1996, pp. 4-9.*
Jabbari, Zhou, Hillier, "A Decomosable Random Walk Model for Mobility in Wireless Communications", Telecommunication Systems 16:3,4, pp. 523-537, 2001.*

* cited by examiner

*Primary Examiner* — Jean A Gelin
(74) *Attorney, Agent, or Firm* — The Farrell Law Firm, P.C.

(57) ABSTRACT

Disclosed is a method and apparatus for cell selection, which can prevent the occurrence of an error in the cell selection in a mobile communication system supporting the hierarchical cell structure. The method includes: when the number of times of cell reselection during a cell reselection time period given to a particular User Equipment (UE) located within a micro cell exceeds a predetermined maximum number of times, determining if a sum of actual occupancy time intervals of the particular UE in Node Bs, services of which the particular UE has used up to then, is smaller than a predetermined value; and when the sum of actual occupancy time intervals of the particular UE in Node Bs, services of which the particular UE has used up to then, is smaller than the predetermined value, determining that the UE is in a low speed state and maintaining the micro cell as a service cell for the UE.

8 Claims, 4 Drawing Sheets

METHOD AND APPARATUS FOR CELL SELECTION IN A MOBILE COMMUNICATION SYSTEM

PRIORITY

This application claims the benefit under 35 U.S.C. §119 (a) of an application entitled "Method And Apparatus For Cell Selection In A Mobile Communication System" filed in the Korean Industrial Property Office on Mar. 2, 2006 and assigned Serial No. 2006-20185, the contents of which are hereby incorporated by reference.

BACKGROUND OF THE INVENTION

1. Field of the Invention

The present invention relates to a mobile communication system, and more particularly to a method and apparatus for cell selection in a mobile communication system supporting a Hierarchical Cell Structure (HCS).

2. Description of the Related Art

In general, a mobile communication system includes a plurality of cells, the cells corresponding to small-sized service areas divided according to Node Bs from the entire service area of the mobile communication system. Each of the Node Bs is controlled in a concentrated manner by a Radio Network Controller (RNC), so that a subscriber can continuously perform the communication while moving between cells. In a mobile communication system, when a User Equipment (UE) escapes from an area of one Node B and enters an area of another Node B, the UE can continuously perform the communication by the handoff function.

A mobile communication system supporting hierarchical cells discriminates between cells depending upon the serviceable area in providing the communication service. In the mobile communication system supporting hierarchical cells, the cells include various types of cells, such as a macro cell, a micro cell, and a pico cell, in order to effectively provide discriminated services according to the areas. The macro cell provides the widest service area, supports fast movement, and has a low data rate. The micro cell provides a narrow service area, supports slow movement, and has a high data rate.

The pico cell is usually used in order to provide a communication service within a building in order to provide a communication service to a particular area, such as a campus, a playground, an airport, and a shopping mall, in order to provide a communication service when a special event or a natural disaster has occurred, in order to provide a communication service to an area in which remote control is impossible, or in order to assist the communication service of a macro cell or a mini cell having a tunnel, or in order to improve the communication quality of an area having a bad communication quality.

Meanwhile, the UE measures reception levels of multiple pilot channels, and performs cell selection based on the measured values. That is, in a cell network having overlapping cells, the UE performs cell selection based on the reception levels. Usually, the UE performs the cell selection by a Received Signal Strength Indicator (RSSI). In a boundary region between two cells, the UE detects an RSSI of a serving cell to which the UE currently belongs, and RSSIs of multiple neighbor cells adjacent to the serving cell. When an RSSI of a neighbor cell is larger than the RSSI of the serving cell, the UE selects the neighbor cell.

Further, when system information or an inner trigger of the UE changes, cell reselection is estimated. The "quality measurement" performed for the cell reselection is measured by a Node B. Further, the "quality measurement" is performed so as to satisfy requirements of the Radio Access Technology (RAT) quality, inter-frequency, or intra-frequency according to the threshold within the system information and the quality level of the serving cell. In a mobile communication system supporting the hierarchical cell structure, a cell with a higher priority (HSC_PRIO) is considered because it is possible to reduce the number of measured cells. At this time, the "quality measurement" includes measurement of the speed of the UE, which will be described hereinafter.

First, determination that the UE moves at a high speed is expressed by formula (1) below.

$$\text{High-Mobility state: \# of re-selection} \gg N_{CR} \text{ during } T_{CRmax} \quad (1)$$

In formula (1), $N_{CR}$ refers to a predetermined maximum number of times for cell reselection, $T_{CRmax}$ refers to a time period for estimating cell reselection, and # of re-selection refers to the number of times of cell reselection. When it is concluded from formula (1) that the number of times of cell reselection is larger than the predetermined maximum number of times for cell reselection during the time period for estimating cell reselection, the Node B determines that the speed of the UE is high. Based on formula (1), the Node B performs the "quality measurement" for only cells having the same priority as or a lower priority than that of the serving cell.

Next, determination that the UE escapes from the high speed state is expressed by formula (2) below.

$$\text{leave the High-Mobility state: \# of re-selection} \leq N_{CR} \text{ during } T_{CRmax} \text{ after } T_{CRmaxhyst} \quad (2)$$

In formula (2), $N_{CR}$ refers to a predetermined maximum number of times for cell reselection, $T_{CRmax}$ refers to a time period for estimating cell reselection, and $T_{CRmaxhyst}$ refers to an additional time period before the UE returns to the low speed state. Here, $T_{CRmaxhyst}$ is a factor added to $T_{CRmax}$ and implies that application of more time is necessary in order to determine that the UE is in a low speed state. When it is concluded from formula (2) that the number of times of cell reselection is smaller than or equal to the predetermined maximum number of times for cell reselection during the time period for estimating the cell reselection after the additional time period before the UE returns to the low speed state, the Node B determines that the UE has escaped from the high speed state.

The "High-Mobility state" in formula (1) can be applied to layers showing a clear difference in signal intensity due to the high priority cell (HCS_PRIO). However, an error may occur when it is applied to cells of the same layer.

Further, it is problematic to use the number of times of cell reselection in determining if the UE is in the high speed state or low speed state. In a boundary region in which cells overlap or an area having a bad signal intensity in which the signaling null occurs, the UE may switch between two or three Node Bs within a short time interval due to the ping-pong effect. This phenomenon is more severe in a micro cell having a narrow cell overlapping area, and may cause a user to erroneously select a macro cell as a serving Node B even when the user is not a high speed user.

Currently, a filtering technique is applied in order to prevent the ping-pong phenomenon in a fast fading situation. If the UE is moving at a high speed (for example, more than 50 km/h), it is relatively easy to average the fast fading. That is, the filtering time is about 100 ms, which is sufficient. However, if the UE is moving at a low speed, that is, when the UE is in a pedestrian environment, a filter having a size of one second is necessary in order to average the fast fading. In this way, by extending the filtering time, the UE can proceed to the area of the neighbor cell before the cell reselection occurs. This may cause high interference to other users, which may decrease the system capacity.

SUMMARY OF THE INVENTION

Accordingly, the present invention has been made to solve the above-mentioned problems occurring in the prior art, and the present invention provides a method and apparatus for cell selection, which can effectively manage resources in a mobile communication system supporting the cell structure.

Also, the present invention provides a method and apparatus for cell selection in a mobile communication system supporting the cell structure, which can prevent a ping-pong phenomenon that may occur in a cell boundary or an area having a bad signal intensity, in the case of considering only the number of times of cell reselection in determining if the speed of a UE is a high speed or a low speed.

Also, the present invention provides a method and apparatus for cell selection in a mobile communication system, which can prevent occurrence of an error in the cell selection by exactly determining if the speed of a UE is a high speed or a low speed.

Also, the present invention provides a method and apparatus for cell selection in a mobile communication system, which can prevent the occurrence of interference in a cell boundary or an area having a bad signal intensity, thereby preventing reduction of the system capacity.

In accordance with an aspect of the present invention, there is provided a method for cell selection by a radio network controller which exclusively controls cells of a communication service area including a plurality of macro cells and a plurality of micro cells divided from each of the macro cells, the method including the steps of: when the number of times of cell reselection during a cell reselection time period given to a particular User Equipment (UE) located within a micro cell exceeds a predetermined maximum number of times, determining if a sum of actual occupancy time intervals of the particular UE in Node Bs, services of which the particular UE has used up to then, is smaller than a predetermined value; and when the sum of actual occupancy time intervals of the particular UE in Node Bs, services of which the particular UE has used up to then, is smaller than the predetermined value, determining that the UE is in a low speed state and maintaining the micro cell as a service cell for the UE.

In accordance with another aspect of the present invention, there is provided a radio network controller for exclusively controlling cells of a communication service area which includes a plurality of macro cells and a plurality of micro cells divided from each of the macro cells, the radio network controller including: an occupancy time measurer for measuring occupancy time of the UE within micro cells providing services; and a controller for, when the number of times of cell reselection during a cell reselection time period given to a particular UE located within a micro cell exceeds a predetermined maximum number of times and when a sum of actual occupancy time intervals of the particular UE in Node Bs, services of which the particular UE has used up to then, is smaller than a predetermined value, determining that the UE is in a low speed state and maintaining the micro cell as a service cell for the UE.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
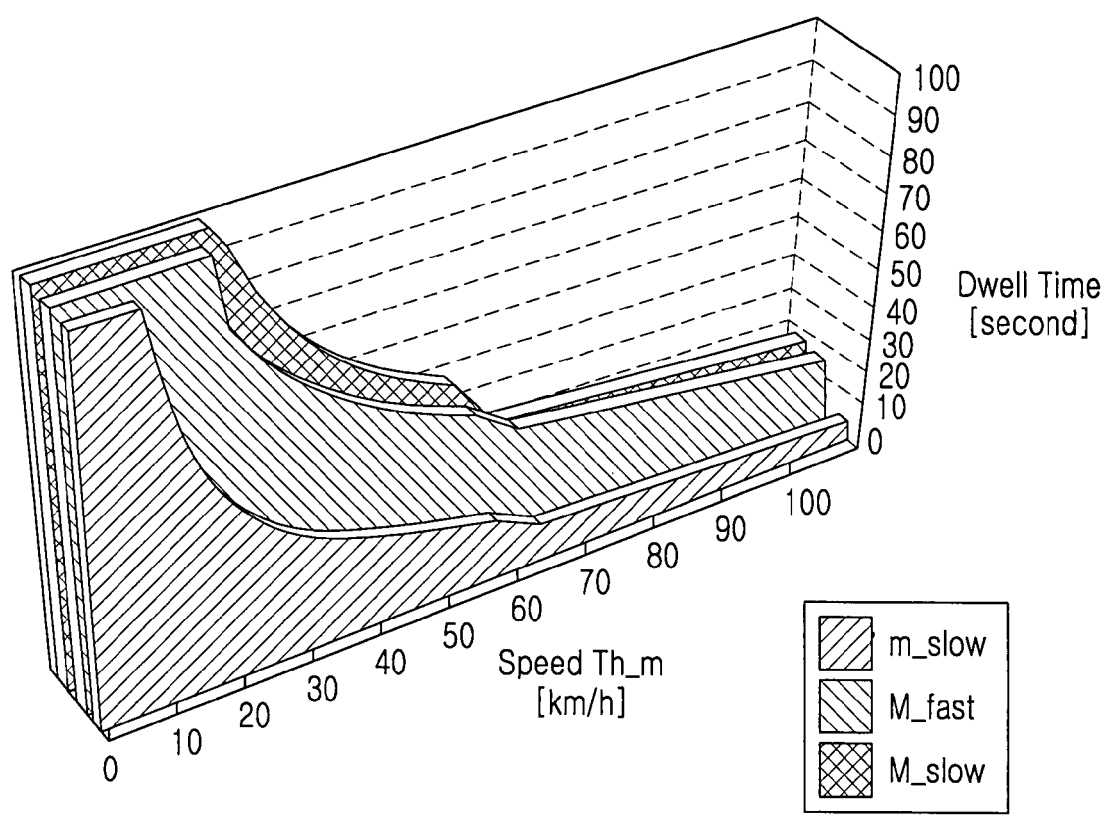
FIG. 1 is a graph illustrating average occupancy time intervals of a micro cell and a macro cell, which are derived by using formulas (7) to (9)

Hereinafter, exemplary embodiments of the present invention will be described with reference to the accompanying drawings. In the following description, various specific definitions found in the following description are provided only to help general understanding of the present invention, and it is apparent to those skilled in the art that the present invention can be implemented without such definitions.

Hereinafter, a method for cell selection in a mobile communication system according to an embodiment of the present invention will be described.

First, the following process is necessary in order to exactly determine if the actual speed of a UE is a high speed or a low speed.

If it is assumed that a speed threshold of users within a micro cell is $V_0$, a time threshold for the time during which the users stay within the cell is $\tau_0$, and the cell radius is R, the time threshold $\tau_0$ can be defined by formula (3) below.

$$\tau_0 = \frac{R\pi}{2V_0} \qquad (3)$$

Formula (3) can be replaced by formula (4) below, which is expressed by using a probability density function f(v) for the speed of the UE.

$$f(v) = \begin{cases} \dfrac{v}{100} & 0 < v \leq 10 \\ -\dfrac{v}{100} + \dfrac{20}{100} & 10 < v \leq 20 \end{cases} \qquad (4)$$

From formula (4), the average speed of a UE within the micro cell can be defined by formula (5) below, and an average speed of a UE within the macro cell can be defined by formula (6) below.

$$E_\mu[v] = \begin{cases} \dfrac{2}{3}V_0 & \text{for } V_0 \leq 10 \\ \dfrac{2}{3}\dfrac{V_0^3 - 30V_0^2 + 1000}{V_0^2 - 40V_0 + 200} & \text{for } 10 < V_0 \leq V_L \end{cases} \qquad (5)$$

-continued $$E_M[v] = \begin{cases} \frac{2}{3} \frac{V_0^3 - 3000}{V_0^2 - 200} & \text{for } V_0 \leq 10 \\ \frac{2}{3} \frac{V_0^3 - 30V_0^2 + 4000}{V_0^2 - 40V_0 + 400} & \text{for } 10 < V_0 \leq V_L \end{cases} \quad (6)$$

In formulas (5) and (6), $V_L$ corresponds to an upper limit of a set speed within a micro cell. If a UE moves faster than $V_L$, it implies that the UE cannot have sufficient time for call setup or handover.

If formula (3) is redefined from formulas (5) and (6), it is possible to obtain formulas (7) to (9) below, by which it is possible to calculate average time intervals during which low speed and high speed users stay in a micro cell and a macro cell. Specifically, formula (7) defines an average time interval during which a low speed user stays in a micro cell, formula (8) defines an average time interval during which a low speed user stays in a macro cell, and formula (9) defines an average time interval during which a high speed user stays in a macro cell.

$$m\_slow = \frac{R\pi}{2E_\mu[v]} \quad (7)$$

$$M\_slow = \frac{R\pi\sqrt{W}}{2E_\mu[v]} \quad (8)$$

$$M\_fast = \frac{R\pi\sqrt{W}}{2E_m[v]} \quad (9)$$

In formulas (8) and (9), W denotes the number of micro cells included in one macro cell.

FIG. 1 is a graph illustrating average occupancy time intervals of a micro cell and a macro cell, which are derived by using formulas (7) to (9). FIG. 1 is based on an assumption that the micro cell and the macro cell have cell radiuses of 327 km and 1 km, respectively, and that one macro cell includes seven micro cells. In FIG. 1, the horizontal axis (x-axis) indicates the speed threshold (speed Th_m [km]). Based on the result shown in FIG. 1, in the worst case, if it is assumed that the moving speed within the micro cell is 100 km/h, the time interval during which the user stays within the micro cell is seven seconds on the average. Therefore, even when there is a request for state transition from the low speed user to the high speed user, it is possible to deny the request if the average occupancy time interval is much lower than a presumed average occupancy time interval.

Figure 2:
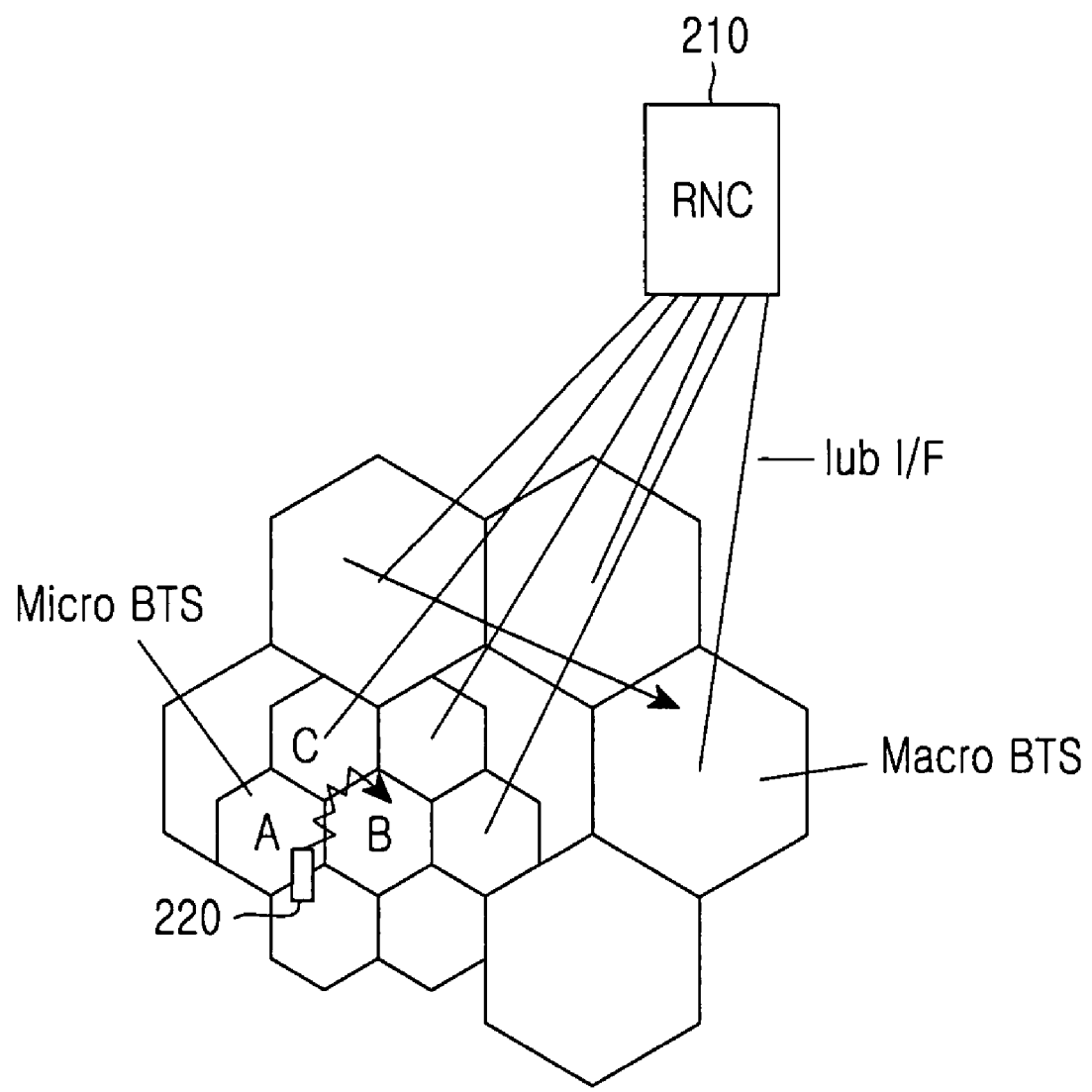
FIG. 2 is a view in order to aid understanding of the present invention.

FIG. 2 is a view in order to aid understanding of the present invention. Referring to FIG. 2, the entire service area of the mobile communication system is divided into a plurality of cells, the cells corresponding to small-sized service areas according to Node Bs, and each of the Node Bs is controlled in a concentrated manner by a Radio Network Controller (RNC), so that a subscriber can continuously perform the communication while moving between cells.

Hereinafter, a case in which a UE 220 moves between micro cells as shown in FIG. 2 will be discussed. When the number of times for the cell change exceeds six times, it is determined that the UE is moving at a high speed, and the cell is changed from a micro cell to a macro cell. It is assumed that the UE moves between micro cells A, B, and C. Specifically, it is assumed that the UE moves between the micro cells in a sequence of micro cells A, B, A, B, C, B, C, and B during a cell reselection period as shown in FIG. 2. Then, the number of times of the cell change exceeds six times, which is the number of times of cell reselection. Then, although the prior art concludes that the UE 220 is moving at a high speed, the present invention determines if there is an error in the conclusion that the UE 220 is moving at a high speed.

That is, it is determined if a sum of the time intervals during which the UE stayed in the Node Bs is larger than a sum of time intervals set in advance during which a high speed UE must stay in each cell in the worst case from FIG. 1. For example, it is assumed that a preset time interval during which a high speed UE must stay in each cell in the worst case is five seconds for micro cell A, four seconds for micro cell B, and six seconds for micro cell C. Then, a sum of the preset time intervals during which a high speed UE must stay in the cells in the worst case is 38 seconds. However, even though the number of times of the cell change is at least seven times, the sum of time intervals during which the UE actually occupied the Node Bs may be less than the preset time, 38 seconds. The value, 38 seconds, is an estimated value in preparation for the worst case, and thus a high speed UE is not allowed to have a sum of occupancy time less than 38 seconds. Therefore, when the sum of occupancy time is less than 38 seconds, the UE is not determined to be a high speed UE but is determined to be a low speed UE, thereby preventing the cell change from the micro cell to the macro cell.

Figure 3:
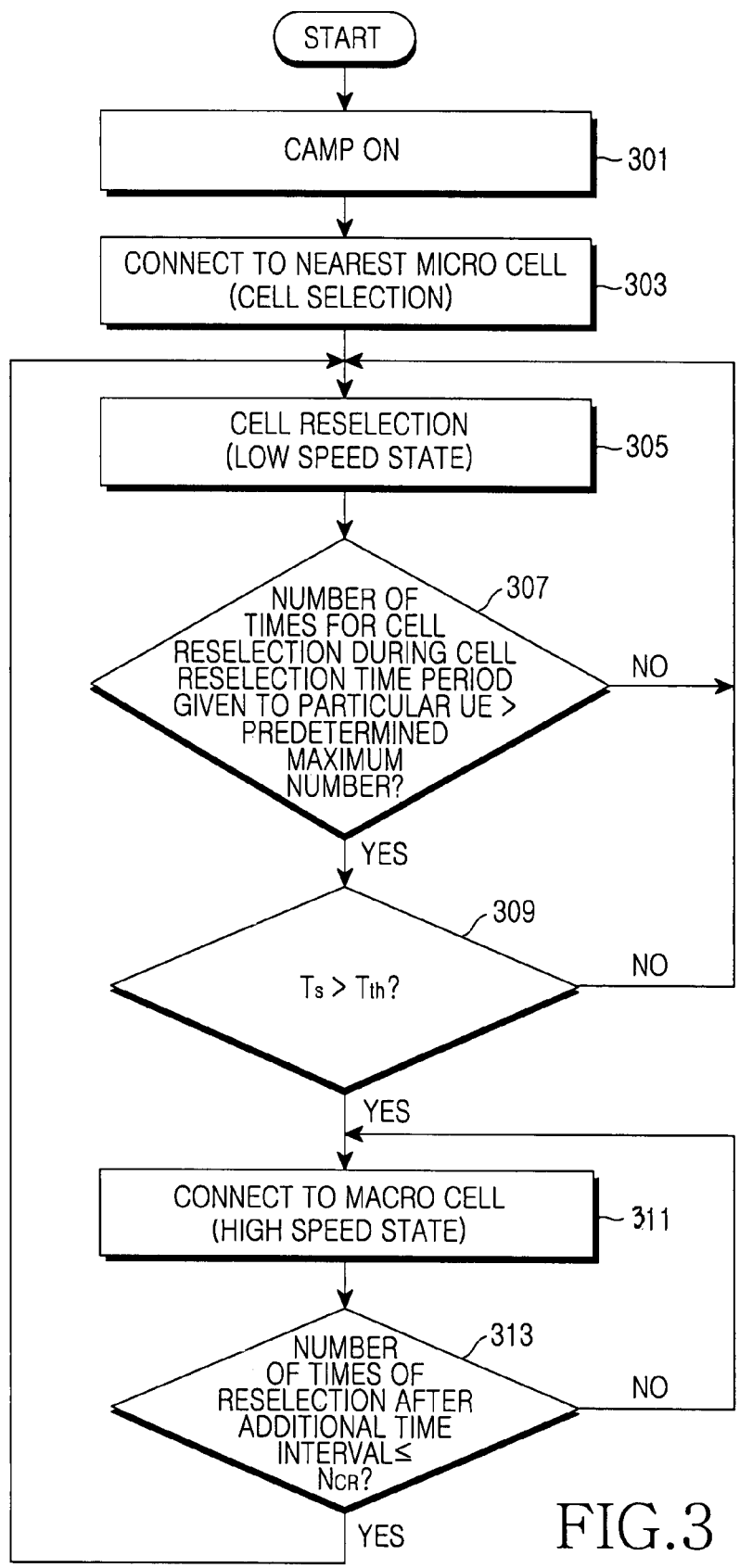
FIG. 3 is a flow diagram illustrating a method for cell selection in a mobile communication system according to an embodiment of the present invention.

FIG. 3 is a flow diagram illustrating a method for cell selection in a mobile communication system according to an embodiment of the present invention. Hereinafter, a method for cell selection in a mobile communication system according to an embodiment of the present invention will be described with reference to FIG. 3.

First, in step 301, the UE waits in a camp-on state. Then, triggering for cell selection occurs. The triggering for cell selection may occur when the power of the UE is turned on or when the state or mode of the UE changes. In step 303, the UE connects to the nearest micro cell. Then, the cell selection is started. When the UE moves between cells, the UE starts cell reselection in step 305. At this time, it is assumed that the UE is a low speed state.

Then, in step 307, a Radio Network Controller (RNC) determines if the number of times of cell reselection during a cell reselection time period given to a particular UE exceeds a predetermined maximum number of times of cell reselection. When the number of times of cell reselection during a cell reselection time period given to a particular UE does not exceed the predetermined maximum number of times, the RNC returns to step 305 in which the RNC determines that the UE is in a low speed state. However, when the number of times of cell reselection during a cell reselection time period given to a particular UE exceeds the predetermined maximum number of times, the RNC determines in step 309 if the sum $T_s$ of the actual occupancy time intervals of the particular UE in Node Bs, services of which the particular UE has used up to then, is larger than the threshold sum $T_{th}$ of the occupancy time intervals predefined in FIG. 1 for the stay of the UE within the Node Bs. The threshold sum $T_{th}$ can be selected from the graph of FIG. 1 by a service provider. When the sum $T_s$ of the actual occupancy time intervals of the particular UE in Node Bs, services of which the particular UE has used up to then, is smaller than or equal to the threshold sum $T_{th}$ of the occupancy time intervals predefined in FIG. 1 for the stay of the UE within the Node Bs, the RNC returns to step 305 in which the RNC determines that the UE is in a low speed state.

In contrast, when the sum $T_s$ of the actual occupancy time intervals of the particular UE in Node Bs, services of which the particular UE has used up to then, is larger than the threshold sum $T_{th}$ of the occupancy time intervals predefined in FIG. 1 for the stay of the UE within the Node Bs, the RNC determines in step 311 that the UE is in a high speed state, and connects to the macro cell.

Then, in step 313, the RNC determines if the number of times of the reselection during the time interval $T_{CRmax}$ for estimation of cell reselection after the additional time interval $T_{CRmaxhyst}$ before the UE returns to the low speed state is smaller than or equal to the predetermined maximum number $N_{CR}$ of times of reselection. When the number of times of reselection during the time interval $T_{CRmax}$ for estimation of cell reselection after the additional time interval $T_{CRmaxhyst}$ before the UE returns to the low speed state is larger than the predetermined maximum number $N_{CR}$ of times of the reselection, the RNC returns to step 311. However, when the number of times of the reselection during the time interval $T_{CRmax}$ for estimation of cell reselection after the additional time interval $T_{CRmaxhyst}$ before the UE returns to the low speed state is smaller than or equal to the predetermined maximum number $N_{CR}$ of times of the reselection, the RNC returns to step 305, in which the RNC determines that the UE is in a low speed state.

Figure 4:
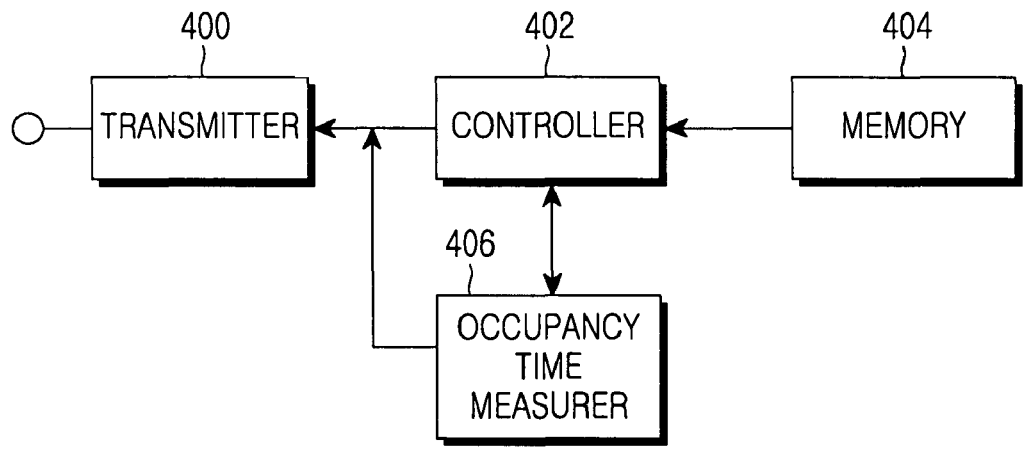
FIG. 4 is a block diagram illustrating a structure of an RNC for implementing a method for cell selection in a mobile communication system according to an embodiment of the present invention.

FIG. 4 is a block diagram illustrating a structure of an RNC for implementing a method for cell selection in a mobile communication system according to an embodiment of the present invention.

Referring to FIG. 4, the RNC includes an occupancy time measurer 406 for measuring occupancy time of the UE within micro cells providing services, and a controller 402 for generally controlling Node Bs. The controller 402 determines if the number of times of cell reselection during a cell reselection time period given to a particular UE exceeds a predetermined maximum number of times of cell reselection, and determines if the sum $T_s$ of the actual occupancy time intervals of the particular UE in Node Bs, services of which the particular UE has used up to then, is larger than the threshold sum $T_{th}$ of the occupancy time intervals predefined in FIG. 1 for the stay of the UE within the Node Bs when the number of times of cell reselection during a cell reselection time period given to a particular UE exceeds the predetermined maximum number of times of cell reselection. Then, the controller 402 determines that the UE is in a high speed state, connects the UE to a macro cell when the sum $T_s$ is larger than the threshold sum $T_{th}$, and determines that the UE is in a low speed state when the sum $T_s$ is smaller than or equal to the threshold sum $T_{th}$. Further, when the number of times of cell reselection during a cell reselection time period given to a particular UE does not exceed the predetermined maximum number of times, the RNC determines that the UE is in a low speed state, and switches the service cell from the macro cell to a micro cell for the UE. Further, the RNC includes a transmitter 400 for converting control data to a signal proper for the Node B and the Intermediate Frequency (IF) and a memory 404 for storing information of the RNC.

Figure 5:
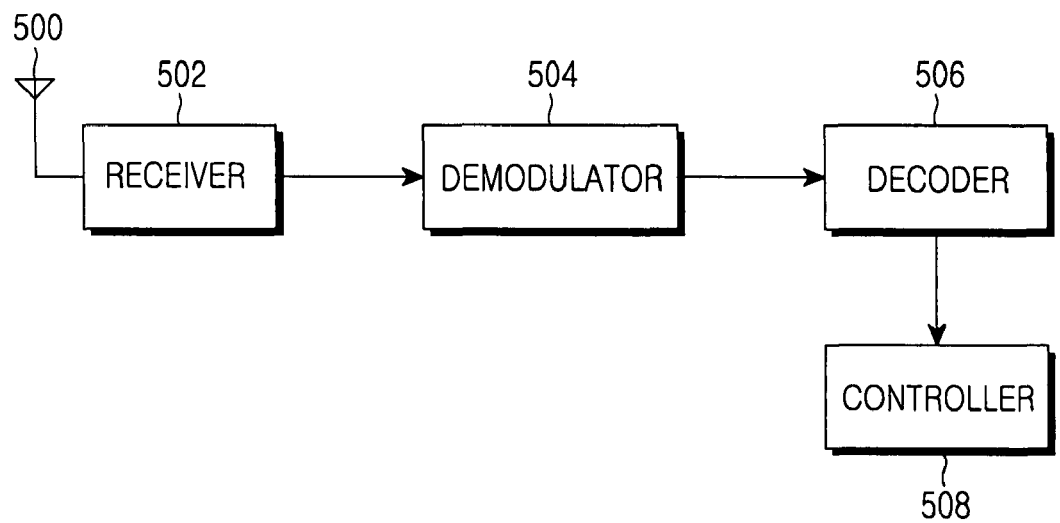
FIG. 5 is a block diagram illustrating a structure of a UE for implementing a method for cell selection in a mobile communication system according to an embodiment of the present invention.

FIG. 5 is a block diagram illustrating a structure of a UE for implementing a method for cell selection in a mobile communication system according to an embodiment of the present invention. The UE includes an antenna 500, a receiver 502 for generating a digital signal by performing various operations including amplification of a signal received through the antenna 500, frequency conversion of the signal into an IF signal, detection, frequency conversion of the signal into a base band signal, etc., a demodulator 504 for demodulating a digital signal received by the receiver 502, a decoder 506 for decoding the signal demodulated by the demodulator 504, and a controller 508 for controlling the general operation of the UE.

According to the present invention as described above, it is possible to exactly determine if a UE is in a high speed state or a low speed state, thereby preventing occurrence of an error in the cell selection.

Also, by the present invention, it is possible to efficiently manage resources in a mobile communication system supporting a cell structure.

Further, by a method and apparatus for cell selection in a mobile communication system supporting the cell structure according to the present invention, it is possible to prevent a ping-pong phenomenon that may occur in a cell boundary or an area having a low signal intensity, in the case of considering only the number of times of cell reselection in determining if the speed of a UE is a high speed or a low speed.

Moreover, by the present invention, it is possible to prevent occurrence of an error in cell selection by exactly determining if a speed of a UE is a high speed or a low speed.

In addition, by the present invention, it is possible to reduce the influence of fading and signaling null, which may occur in a wireless environment, by preventing occurrence of an error in the cell selection. By reducing the influence of fading and signaling null, it is possible to more exactly recognize the state of a UE and is thus possible to effectively distribute traffic in a mobile communication system supporting a cell structure.

Also, by the present invention, it is possible to prevent occurrence of interference in a cell boundary or an area having a bad signal intensity, thereby preventing reduction of the system capacity.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for cell selection by a radio network controller which exclusively controls cells of a communication service area including a plurality of macro cells and a plurality of micro cells divided from each of the macro cells, the method comprising the steps of:

when the number of times of cell reselection during a cell reselection time period given to a particular User Equipment (UE) located within a micro cell exceeds a predetermined maximum number of times, determining if a sum of actual occupancy time intervals of the particular UE in Node Bs, services of which the particular UE has used up to then, is smaller than a predetermined value; and when the sum of actual occupancy time intervals of the particular UE in Node Bs, services of which the particular UE has used up to then, is smaller than the predetermined value, determining that the particular UE is in a low speed state and maintaining the micro cell as a service cell for the particular UE, wherein the predetermined value corresponds to an average occupancy time interval, and the average occupancy time interval is calculated according to an average speed of the particular UE.

2. The method as claimed in claim 1, further comprising the steps of:

when the sum of actual occupancy time intervals of the particular UE in Node Bs, services of which the particular UE has used up to then, is larger than or equal to the predetermined value, determining that the particular UE is in a high speed state and changing the service cell for the particular UE from the micro cell to a macro cell; and when the number of times of reselection during a time interval for estimation of cell reselection after an additional time interval before the particular UE returns to the low speed state is smaller than or equal to the predetermined maximum number of times, determining that the particular UE is in a low speed state and changing the service cell for the particular UE from the macro cell to a micro cell.

3. The method as claimed in claim 1, wherein, in calculating an occupancy time interval of the particular UE in Node Bs, a threshold for time during which the particular UE stays in a micro cell is defined by $$\tau_0 = \frac{R\pi}{2V_0},$$

wherein $V_0$ denotes a speed threshold of the particular UE within a micro cell, $\tau_0$ denotes the threshold for time during which the particular UE stays in a micro cell, and R denotes a cell radius.

4. The method as claimed in claim 3, wherein an average time interval during which a low speed user stays in a micro cell is defined by $$m\_slow = \frac{R\pi}{2E_\mu[v]}.$$

5. The method as claimed in claim 3, wherein an average time interval during which a low speed user stays in a macro cell is defined by $$M\_slow = \frac{R\pi\sqrt{W}}{2E_\mu[v]}.$$

6. The method as claimed in claim 3, wherein an average time interval during which a high speed user stays in a macro cell is defined by $$M\_fast = \frac{R\pi\sqrt{W}}{2E_\mu[v]}.$$

7. A radio network controller for exclusively controlling cells of a communication service area which includes a plurality of macro cells and a plurality of micro cells divided from each of the macro cells, the radio network controller comprising:
an occupancy time measurer for measuring occupancy time of the UE within micro cells providing services; and
a controller for, when the number of times of cell reselection during a cell reselection time period given to a particular User Equipment (UE) located within a micro cell exceeds a predetermined maximum number of times and when a sum of actual occupancy time intervals of the particular UE in Node Bs, services of which the particular UE has used up to then, is smaller than a predetermined value, determining that the particular UE is in a low speed state and maintaining the micro cell as a service cell for the particular UE,
wherein the predetermined value corresponds to an average occupancy time interval, and the average occupancy time interval is calculated according to an average speed of the particular UE.

8. The radio network controller as claimed in claim 7, wherein the controller determines that the particular UE is in a high speed state and changes the service cell for the particular UE from the micro cell to a macro cell when the sum of actual occupancy time intervals of the particular UE in Node Bs, services of which the particular UE has used up to then, is larger than or equal to the predetermined value and when a sum of occupancy time within the micro cell is larger than the predetermined value, and the controller determines that the particular UE is in a low speed state and changes the service cell for the particular UE from the macro cell to a micro cell when the number of times of reselection during a time interval for estimation of cell reselection after an additional time interval before the particular UE returns to the low speed state is smaller than or equal to a predetermined maximum number of times.

* * * * *